United States Patent
Zillmer et al.

(10) Patent No.: US 7,649,273 B2
(45) Date of Patent: Jan. 19, 2010

(54) HYBRID DRIVE UNIT HAVING A LOW-TEMPERATURE CIRCUIT

(75) Inventors: Michael Zillmer, Sickte (DE); Ekkehard Pott, Gifhorn (DE); Matthias Holz, Lehre (DE); Marc Hladun, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 1 day.

(21) Appl. No.: 11/538,998

(22) Filed: Oct. 5, 2006

(65) Prior Publication Data
US 2007/0137909 A1 Jun. 21, 2007

(30) Foreign Application Priority Data
Oct. 5, 2005 (DE) .................. 10 2005 047 653

(51) Int. Cl.
*F01P 11/00* (2006.01)
(52) U.S. Cl. .................. 290/40 C; 123/41.31
(58) Field of Classification Search ................ 290/40 C
See application file for complete search history.

(56) References Cited

U.S. PATENT DOCUMENTS

| | | | | |
|---|---|---|---|---|
| 5,598,705 A * | 2/1997 | Uzkan | .................. | 60/599 |
| 5,881,559 A * | 3/1999 | Kawamura | .................. | 60/597 |
| 5,910,099 A * | 6/1999 | Jordan et al. | .................. | 60/599 |
| 6,321,697 B1 * | 11/2001 | Matsuda et al. | .......... | 123/41.29 |
| 6,394,210 B2 * | 5/2002 | Matsuda et al. | ............ | 180/68.1 |
| 6,397,965 B1 * | 6/2002 | McFarlane et al. | .......... | 180/298 |
| 6,450,275 B1 * | 9/2002 | Gabriel et al. | ............ | 180/65.23 |
| 6,467,286 B2 * | 10/2002 | Hasebe et al. | .................. | 62/185 |
| 6,554,088 B2 * | 4/2003 | Severinsky et al. | .......... | 180/65.2 |
| 6,557,347 B1 * | 5/2003 | Alvarez et al. | ................. | 60/611 |
| 6,817,182 B2 * | 11/2004 | Clawson | ...................... | 60/670 |
| 6,931,850 B2 * | 8/2005 | Frank et al. | .................... | 60/608 |
| 7,059,278 B2 * | 6/2006 | Hedrick et al. | ........... | 123/41.14 |
| 7,147,038 B2 * | 12/2006 | Taguchi | ...................... | 165/41 |
| 7,343,884 B1 * | 3/2008 | Carney et al. | ............ | 123/41.54 |
| 7,377,237 B2 * | 5/2008 | Carney et al. | ............ | 123/41.31 |

(Continued)

FOREIGN PATENT DOCUMENTS

DE 10254069 A1 6/2004

(Continued)

OTHER PUBLICATIONS

International Search Report for International Application No. 102005047653.8 (4 pages), Jan. 1, 2006.

*Primary Examiner*—Joseph Waks
(74) *Attorney, Agent, or Firm*—King & Spalding L.L.P.

(57) ABSTRACT

A hybrid drive unit (10) for a motor vehicle with an internal combustion engine (12) and at least one electric machine (14) optionally operable as a motor or as a generator, has a charge air compressor (22) for compression of combustion air supplied to the internal combustion engine (12) and a charge air cooler (32) for cooling the combustion air. The hybrid drive unit (10) has a low-temperature cooling circuit (38) carrying a liquid coolant and is designed separately from a high-temperature cooling circuit of the internal combustion engine (12) and has a heat exchanger (42) for cooling the coolant, whereby the low-temperature cooling circuit (38) includes the charge air cooler (32) and the electric machine (12) and/or electronic components (34, 36) allocated to the electric machine (14).

19 Claims, 2 Drawing Sheets

U.S. PATENT DOCUMENTS

| | | | |
|---|---|---|---|
| 7,454,896 B2 * | 11/2008 | Chalgren et al. | 60/278 |
| 2003/0230996 A1 * | 12/2003 | Gabriel et al. | 318/599 |
| 2005/0022545 A1 * | 2/2005 | Taguchi | 62/239 |
| 2006/0260304 A1 * | 11/2006 | Ishiwatari | 60/599 |
| 2007/0175212 A1 * | 8/2007 | Uno et al. | 60/519 |
| 2008/0006229 A1 * | 1/2008 | Wilmink et al. | 123/41.33 |

FOREIGN PATENT DOCUMENTS

| | | | |
|---|---|---|---|
| EP | 0835989 A1 | | 9/1996 |
| EP | 835989 A1 | * | 4/1998 |
| EP | 1854974 A1 | * | 11/2007 |
| JP | 06093875 A | * | 4/1994 |
| JP | 11093659 A | * | 4/1999 |

* cited by examiner

HYBRID DRIVE UNIT HAVING A LOW-TEMPERATURE CIRCUIT

PRIORITY

This application claims priority from German Patent Application No. DE 10 2005 047 653.8, which was filed on Oct. 5, 2005, and is incorporated herein by reference in its entirety.

TECHNICAL FIELD

The invention relates to a hybrid drive unit of a motor vehicle comprising as drive units an internal combustion engine and also at least one switchable electric machine, optionally in motor operation or generator operation.

BACKGROUND

The term hybrid vehicle refers to motor vehicles in which at least two drive units are combined, accessing different energy sources to provide the power for the vehicle drive. The properties of an internal combustion engine, which generates kinetic energy by combustion of gasoline or diesel fuels, and an electric machine, which converts electric energy to kinetic energy, are supplemented especially advantageously. Hybrid vehicles today are therefore equipped primarily with a combination of an internal combustion engine and one or more electric machines.

Two different hybrid concepts can be differentiated. With the so-called serial hybrid concept, the vehicle drive is accomplished exclusively via the electric machine, whereas the internal combustion engine generates the electric current via a separate generator for charging an energy storage device that supplies power to the electric machine and/or for direct power supply to the electric machine. On the other hand, parallel hybrid concepts are preferred today, at least in passenger vehicle applications, where the vehicle drive may be formed by the internal combustion engine as well as by the electric machine.

The electric machines used in such parallel concepts can be operated optionally in motor operation or generator operation. For example, the electric machine is supportively connected to the internal combustion engine (booster operation), typically at operating points of higher vehicle loads. Furthermore, it may assume the function of a starter motor for the internal combustion engine. On the other hand, the electric machine is operated primarily as a generator during driving operation using the internal combustion engine, with the electric power of the electric machine generated in this way being used to charge the energy storage device and/or to supply power to a vehicle electric system, for example. In the case of a hybrid concept with power branching using more than one electric machine, generator operation of an electric machine can also be used to supply power to another electric machine. Furthermore, at least a portion of the braking power is usually applied by the electric machine being operated in generator mode (recuperation), whereby a portion of the mechanical energy loss is converted to electric power. In hybrid concepts it is generally an advantage that the electric machines operate with a better efficiency in comparison with conventional claw pole generators.

The individual components of an electric drive unit include the electric machine itself, power electronics, a power inverter, at least one energy storage device (especially a battery or capacitor storage device) and the like. Due to their high converted electric power and the associated heat loss, these components have a very high cooling demand. Above an electric power of 5 kW, the system is usually cooled, typically with water cooling. Since the electric components, especially in the power electronics, are extremely sensitive to temperature, the temperature threshold values allowed here must not be exceeded because otherwise irreversible damage could occur or the lifetime could be shortened significantly. Likewise, a high thermal shock stress has a shortening effect on the lifetime of components. Consequently, a cooling supply with a sufficiently low temperature and also low temperature fluctuations is desirable here.

Today's power electronics designed for hybrid drives typically have water forward-flow temperatures of approximately 60° C. to 80° C. Thus a direct link of these components to the cooling circuit of the internal combustion engine is extremely critical because, depending on the thermostat design, the size of the vehicle radiator and the precise location of the link, coolant temperatures of 80° C. to 120° C. may be reached. Even if the coolant is branched off immediately after it leaves the vehicle radiator, peak temperatures above 80° C. are reached although the average water temperatures are much lower at this point. One problem with a water tap downstream from the vehicle radiator is the great fluctuations in water temperature due to the thermostatic regulation, which depends on the driving profile.

An arrangement of a cooling circuit of a hybrid drive is known from the older patent application DE 10 2005 003 881.6, for example. The cooling circuit described there includes electronic components of the hybrid drive as well as the internal combustion engine-in a parallel circuit. Due to the arrangement of controllable valves at the connecting points of the partial coolant circuit, which includes the electronic components, partial decoupling from the engine cooling circuit is achieved and thus the direct effect of the relatively high coolant temperatures of the engine cooling circuit on the electronic components is reduced.

With supercharged internal combustion engines, i.e., engines in which the combustion air is compressed especially with an exhaust operated charge air compressor, charge air cooling is generally used. To this end, predominately an air-air cooler situated in the area of the front end of the vehicle is used because this type is associated with low costs. One disadvantage of this type of cooler is its limited cooling capacity, the great dependence on vehicle speed, the large amount of space required and the fact that due to the arrangement at a distance from the engine, relatively long lines to and from the charge air cooler must be accommodated, which is a disadvantage with regard to the dynamics and response of the cooling. In this regard, water-operated charge air coolers that allow a high cooling capacity, take up much less space and therefore can usually be installed directly on the engine with short connecting lines are advantageous but they are associated with significantly higher costs. A high cooling performance with very good dynamics can be achieved with this design.

SUMMARY

The object of the present invention is to propose a hybrid drive unit, which includes a supercharged internal combustion engine and at least one electric machine, wherein, the electric machine and the electronic components allocated to it are reliably protected from harmful temperatures and high-temperature fluctuations.

This object can be achieved by a hybrid drive unit for a motor vehicle, with an internal combustion engine and at least one electric machine which is optionally operable as a motor or as a generator, a charge air compressor for compression of combustion air supplied to the internal combustion engine, a charge air cooler for cooling the combustion air, and a low-temperature cooling circuit carrying a liquid coolant and having a heat exchanger for cooling the coolant, whereby the low-temperature cooling circuit includes the charge air cooler and the electric machine and/or electronic components allocated to the electric machine.

The electronic components allocated to the at least one electric machine may include power electronics and/or a DC/DC converter and/or an pulse-width-modulation inverter and/or at least one energy storage device, in particular a condenser storage mechanism. The heat exchanger for cooling the cooling medium of the low-temperature cooling circuit can be an air-water heat exchanger. The low-temperature cooling circuit can be designed so that a coolant temperature of max. 80° C. is not exceeded during at least 70% of a vehicle operating time. The low-temperature cooling circuit can be designed so that a coolant temperature of max. 80° C., especially max. 70° C., preferably max. 60° C. is not exceeded for at least 80%, especially at least 90%, preferably at least 95% of the vehicle operating time. The internal combustion engine can be integrated into a separate engine cooling circuit. The engine cooling circuit and the low-temperature cooling circuit can be connected to one another via a feed-through site, in particular a feed-through site whose flow rate is controllable. The low-temperature cooling circuit may have a coolant pump.

According to this invention, the hybrid drive has a low-temperature cooling circuit, which carries a liquid cooling medium and has a heat exchanger for cooling the coolant. The inventive low-temperature cooling circuit includes a charge air cooler on the one hand for cooling the combustion air supply to the internal combustion engine and on the other hand the electric machine and/or electronic components, which are allocated to the electric machine. With the inventive low-temperature cooling circuit, the cooling of such components of the drive unit, which require a relatively low cooling level with a relatively weak cooling power in comparison with the internal combustion engine, is combined in an independent cooling circuit that is separate from the engine cooling circuit (with its relatively high absolute temperatures and great temperature fluctuations). It is possible in this way to reliably ensure a sufficiently low temperature level of the electronic components while also preventing great temperature fluctuations such as those, which occur in conventional engine cooling circuits. Thermal damage and accelerated aging of the components can be effectively prevented in this way.

The inventive low-temperature cooling circuit is suitable for including and thus cooling all electronic components of the hybrid drive that require cooling. This includes, in addition to the electric machine itself, the electronic components allocated to it such as the power electronics for controlling and switching the motor and generator operation of the electric machine, DC/DC converters, pulse-width-modulation inverters and/or one or more energy storage devices which are preferably designed as capacitor storage devices. These components may be arranged in any order in the direction of flow of the coolant.

Essentially the heat exchanger for cooling the cooling medium of the low-temperature cooling circuit may be a water-water heat exchanger based on water cooling as well as an air-water heat exchanger that performs air cooling of the cooling medium. It is preferable here for the heat exchanger to be an air-water heat exchanger because such a heat exchanger is associated with a lower cost and at the same time provides adequate cooling power for the present requirements.

According to an embodiment, the low-temperature cooling circuit is designed so that a coolant temperature of max. 80° C. is not exceeded for at least 70% of the vehicle operating time. This minimum cooling power is sufficient to protect the typical power electronics in use today. It may be even more advantageous for this coolant temperature not to be exceeded for at least 80%, especially at least 90%, preferably at least 95% of the vehicle operating time. Depending on the sensitivity of the components used, the coolant temperature threshold to be maintained during these operating times may also be given as max. 70° C., especially max. 60° C. Those skilled in the art will be familiar with how to achieve the cooling power required to maintain such threshold values. For example, the arrangement of the heat exchanger for cooling the cooling medium and its design, the volume of the cooling medium, the delivery volume of the coolant pump and/or other parameters may be coordinated as a function of the electric power and heat loss of the electronic components.

The internal combustion engine can be integrated in a traditional manner into a separate engine cooling circuit, preferably based on water cooling of the internal combustion engine. According to an embodiment of the invention, the engine cooling circuit and the low-temperature cooling circuit can be linked together by a feed-through point, the flow rate of which is preferably controllable or switchable. In this way, it is possible to maintain the desired temperature level in the low-temperature cooling circuit even more accurately, e.g., by thermostatically regulated admixture of cooling water at a higher temperature. Furthermore, this makes it possible to eliminate separate filling and separate equalizing tank, if applicable, so this makes the system especially inexpensive.

BRIEF DESCRIPTION OF THE DRAWINGS

The invention is explained in greater detail below in an exemplary embodiment on the basis of the drawings.

DETAILED DESCRIPTION

Figure 1:
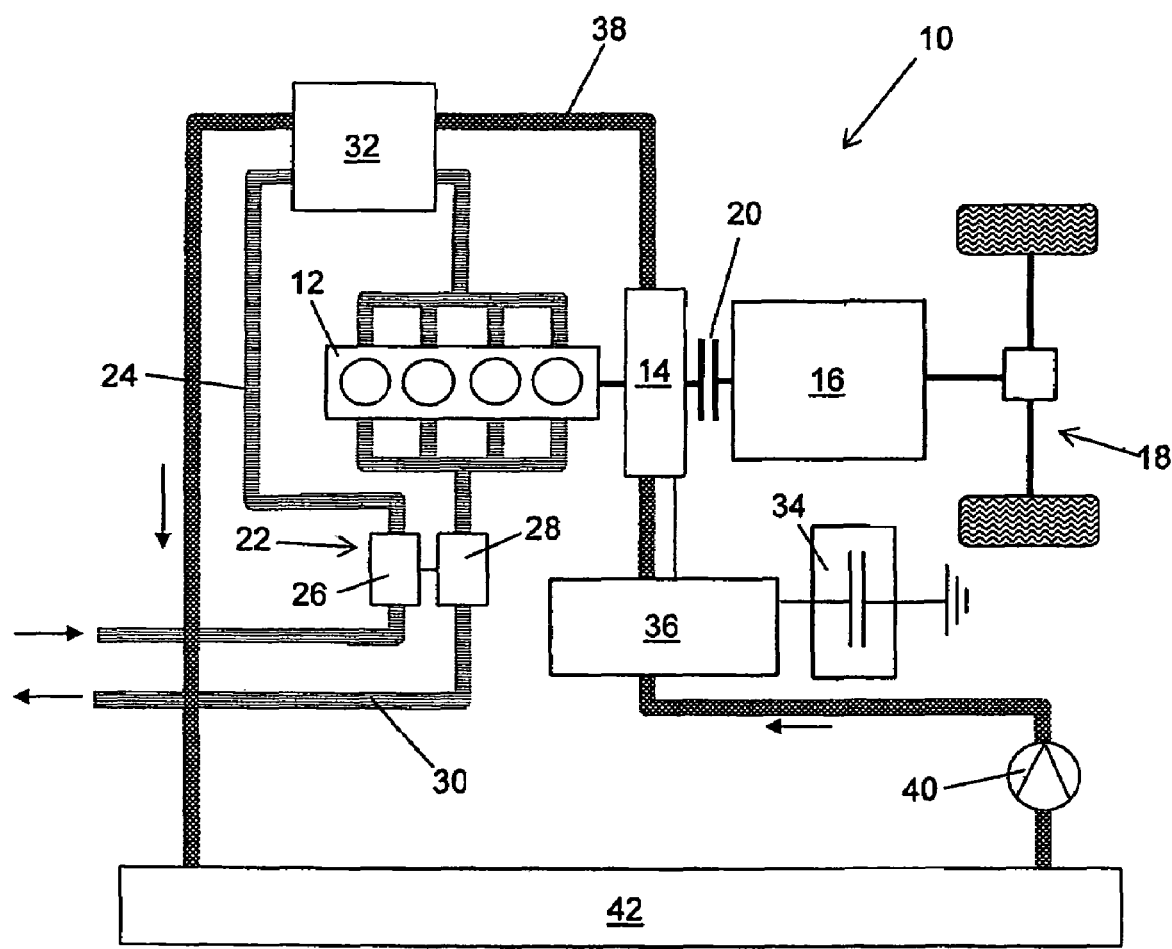
FIG. 1 shows schematically the design of an inventive hybrid drive unit according to a preferred embodiment of the invention.

The figure shows a parallel hybrid drive unit labeled as 10 on the whole for a hybrid vehicle (not shown). The drive of the vehicle is accomplished optionally or simultaneously by a conventional internal combustion engine 12 (gasoline or diesel engine) and an electric machine 14 (electric motor, electric machine) both of which act on the same shaft, in particular the crankshaft of the internal combustion engine 12. The electric motor 14 may be connected to the engine crankshaft in various ways. For example, the electric motor 14 may be connected to the crankshaft either directly or by way of a clutch or a belt drive, e.g., a toothed belt, or a transmission or gear or some other frictionally engaged and/or form-fitting connection. The internal combustion engine 12 and the electric motor 14 are connected to a drive train 18 as indicated here by way of a transmission 16 (automatic or manual transmission). The drive shafts of the internal combustion engine 12 and/or the electric motor 14 are isolated from the transmission 16 by a clutch 20, which can be disengaged by the driver by operating a clutch pedal (not shown) (in the case of a manual transmission 16 at any rate) and can be engaged when the clutch pedal is not being operated. Between the internal combustion engine 12 and the electric motor 14, an additional clutch may optionally also be provided, allowing uncoupling of the internal combustion engine 12 from the drive train 18 and/or the electric motor 14, which essentially yields the advantage that when the internal combustion engine 12 is turned off, its mechanical friction resistance need not be entrained. The additional clutch therefore produces an additional fuel-saving potential but is also associated with a higher cost as well as design and space complexity. Within the context of the present invention, the additional clutch between the internal combustion engine 12 and the electric motor 14 will not be considered further.

The internal combustion engine 12 is supplied with compressed charge air via a charge air compressor 22, in particular an exhaust gas turbocharger. To this end, air is drawn in through an intake line 24 and compressed by a compressor 26 arranged in the intake line 24. The compressor 26 is driven by an exhaust gas turbine 28 of the charge air compressor 22, which is arranged in an exhaust line 30 and is operated by the exhaust of the internal combustion engine 12. Intake air heated by compression is cooled via a water-cooled charge air cooler 32 provided in the exhaust line 30. An engine cooling circuit for cooling the internal combustion engine 12 is operated with an aqueous coolant, which is usually cooled by a heat exchanger of the air-water design.

The electric motor 14, which is a three-phase synchronous motor or asynchronous motor, for example, may be operated optionally with a positive electromotor torque in motor operation or with a negative electromotor torque in generator operation. In motor operation, the electric motor 14 drives the drive train 18—either alone or supporting the torque of the internal combustion engine 12—and consumes electric power (electric current). The electric motor 14 obtains this electric power from an electric storage mechanism 34, which may be a battery and/or preferably a capacitor storage device. In generator operation, however, the electric motor 14 is driven by the internal combustion engine 12 and/or by a push mode of the vehicle with the clutch 20 engaged and converts the kinetic energy into electric energy to charge the energy storage device 34. The electric motor 14 is switched between motor operation and generator operation by the power electronics 36, simultaneously performing any conversion between DC and AC current as needed. Other electronic components (not shown), which are allocated to the electric machine 14, may include DC/DC converters, pulse-width-modulation inverters, and the like.

According to the concept presented here, the vehicle drive is accomplished primarily by the internal combustion engine 12, which is started by an electric motor 14 in the form of a starter generator. The electric motor 14 also has a boosting function in that it is brought online to support the vehicle drive in high-load situations, in particular during acceleration of the vehicle (motor operation). However, in driving situations in which the vehicle has an excess of kinetic energy, the electric motor 14 has a so-called recuperation function wherein it converts the kinetic energy into electricity to charge the energy storage device 34 in generator operation and thus at the same time provides a braking torque. An electric motor 14 that is especially suitable in this connection has a power of max. 50 kW, especially max. 30 kW, preferably in the range of 15 to 25 kW, especially approx. 20 kW.

As already explained in the introduction, owing to the electric heat losses by the electronic components, there is a need for cooling of the electric machine 14 and the electronic components allocated to it. Cooling is provided especially for those components having an electric power of 5 kW or higher. To this end, according to this invention a low-temperature cooling circuit 38 is provided in which a liquid coolant, usually water with additives, is conveyed by means of an electrically or mechanically operated coolant pump 40. The low-temperature cooling circuit 38 includes, in addition to the charge air cooler 32, the power electronics 36, and the electric machine 14. In deviation from the present example, however, the energy storage device 34 may also be cooled by the low-temperature cooling circuit 38. Cooling of the coolant of the low-temperature cooling circuit 38 is accomplished via a heat exchanger 42, preferably an air-water cooler situated in the area of the front end of the vehicle. The volume of the coolant and the pumping capacity of the coolant pump 40, the design and arrangement of the heat exchanger 42 in the vehicle and/or other parameters of the low-temperature cooling circuit 38 are preferably selected so that a maximum coolant temperature of 60° C. is not exceeded for at least 95% of the operating time at least in the area of the components having the greatest temperature sensitivity, especially the power electronics 36. On the other hand, a typical coolant temperature in the engine cooling circuit (not shown) would be 80° C. to 120° C. By uncoupling the cooling of the electronic components from the engine cooling, it is thus possible not only to maintain a lower coolant temperature level but also to minimize temperature fluctuations, which result in alternating temperature stresses that shorten the lifetime of the components.

Figure 2:
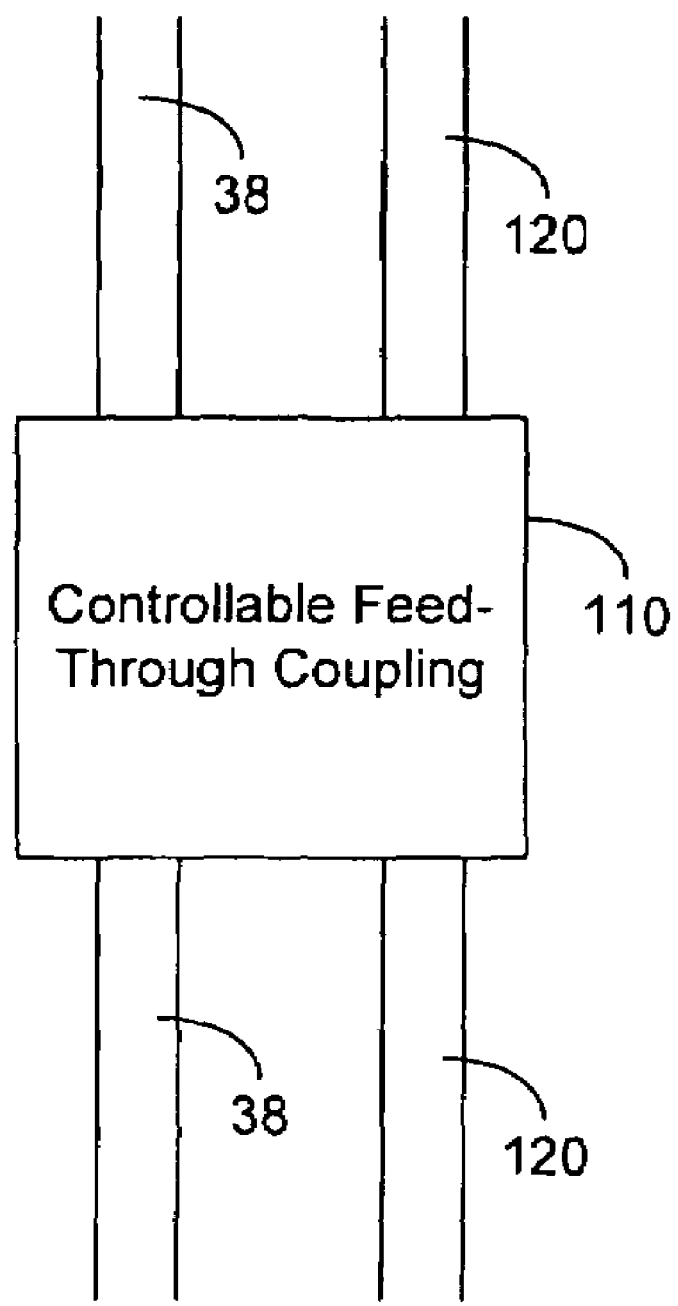
FIG. 2 shows the optional coupling between the engine cooling circuit and the low-temperature cooling circuit.

In the example depicted here, the sequence in which the components are cooled by the low-temperature cooling circuit 38 is, first, the power electronics 36, then the electric machine 14 and finally the charge air cooler 32 according to the direction of conveyance of the coolant as indicated with arrows, but the order of the individual components and the direction of conveyance of the coolant pump 40 may also be designed differently. Preferably, however, the component having the greatest sensitivity to temperature is installed at the coolest location in the low-temperature cooling circuit 38, which is usually close to the outlet of the heat exchanger 42. In addition, as shown in FIG. 2, it is also conceivable to connect the low-temperature cooling circuit 38 to the engine cooling circuit (120) by means of a controllable feed-through site 110 in particular.

LIST OF REFERENCE NUMERALS 10 hybrid drive unit
12 internal combustion engine
14 electric machine
16 transmission
18 drive train
20 clutch
22 charge air compressor
24 intake line
26 compressor
28 exhaust gas turbine
30 exhaust gas line
32 charge air cooler
34 energy storage device
36 power electronics
38 low-temperature cooling circuit
40 coolant pump
42 heat exchanger (cooler)

What is claimed is:
1. A hybrid drive unit for a motor vehicle, comprising:
an internal combustion engine and at least one electric machine which is optionally operable as a motor or as a generator, wherein both the internal combustion engine and the at least one electric machine are coupled to a drive train of the motor vehicle to provide a hybrid drive system in which both can drive the drive train simultaneously, a charge air compressor for compression of combustion air supplied to the internal combustion engine, a charge air cooler for cooling the combustion air, and a low-temperature cooling circuit carrying a liquid coolant and having a heat exchanger for cooling the coolant, wherein the low-temperature cooling circuit providing the liquid coolant to (a) the charge air cooler and to (b) at least one of the electric machine and electronic components allocated to the electric machine, wherein at least a portion of such elements cooled by the liquid coolant are provided with the liquid coolant in series and are arranged such that the element having the greatest sensitivity to temperature is first in series to receive the liquid coolant.

2. The hybrid drive unit according to claim 1, wherein the electronic components allocated to the at least one electric machine include at least one of power electronics, a DC/DC converter, an pulse-width-modulation inverter, at least one energy storage device, and a condenser storage mechanism.

3. The hybrid drive unit according to claim 1, wherein the heat exchanger for cooling the cooling medium of the low-temperature cooling circuit is an air-water heat exchanger.

4. The hybrid drive unit according to claim 1, wherein the low-temperature cooling circuit is designed so that a coolant temperature of max. 80° C. is not exceeded during at least 70% of a vehicle operating time.

5. The hybrid drive unit according to claim 4, wherein the low-temperature cooling circuit is designed so that a coolant temperature of max. 80° C. is not exceeded for at least 80% of the vehicle operating time.

6. The hybrid drive unit according to claim 4, wherein the low-temperature cooling circuit is designed so that a coolant temperature of max. 60-70° C. is not exceeded for at least 80% of the vehicle operating time.

7. The hybrid drive unit according to claim 4, wherein the low-temperature cooling circuit is designed so that a coolant temperature of max. 80° C. is not exceeded for at least 90% or at least 95% of the vehicle operating time.

8. The hybrid drive unit according to claim 1, wherein the internal combustion engine is integrated into a separate engine cooling circuit.

9. The hybrid drive unit according to claim 8, wherein the engine cooling circuit and the low-temperature cooling circuit are connected to one another via a feed-through site.

10. The hybrid drive unit according to claim 8, wherein the engine cooling circuit and the low-temperature cooling circuit are connected to one another via a feed-through site whose flow rate is controllable.

11. The hybrid drive unit according to claim 1, wherein the low-temperature cooling circuit has a coolant pump.

12. A hybrid drive unit for a motor vehicle, comprising:
an internal combustion engine coupled with a first cooling circuit,
at least one electric machine which is optionally operable as a motor or as a generator,
a charge air compressor for compression of combustion air supplied to the internal combustion engine,
a charge air cooler for cooling the combustion air, and
a second cooling circuit carrying a liquid coolant and having a heat exchanger for cooling the coolant, wherein the second cooling circuit provides the liquid coolant to (a) the charge air cooler and (b) at least one of the electric machine and electronic components allocated to the electric machine, wherein at least a portion of such elements cooled by the liquid coolant are provided with the liquid coolant in series and are arranged such that the element having the greatest sensitivity to temperature is first in series to receive the liquid coolant, and
wherein the second cooling circuit is coupled with the first cooling circuit via a feed-through site and wherein the second cooling circuit has a lower temperature than the first cooling circuit.

13. The hybrid drive unit according to claim 12, wherein the heat exchanger for cooling the cooling medium of the low-temperature cooling circuit is an air-water heat exchanger.

14. The hybrid drive unit according to claim 12, wherein the low-temperature cooling circuit is designed so that a coolant temperature of max. 80° C. is not exceeded during at least 70% of a vehicle operating time.

15. The hybrid drive unit according to claim 14, wherein the low-temperature cooling circuit is designed so that a coolant temperature of max. 80° C. is not exceeded for at least 80% of the vehicle operating time.

16. The hybrid drive unit according to claim 12, wherein the flow rate of the feed-through site is controllable.

17. The hybrid drive unit according to claim 12, wherein the second cooling circuit has a coolant pump.

18. A hybrid drive unit for a motor vehicle, comprising:
an internal combustion engine and at least one electric machine which is optionally operable as a motor or as a generator,
a charge air compressor for compression of combustion air supplied to the internal combustion engine,
a charge air cooler for cooling the combustion air, and
a low-temperature cooling circuit carrying a liquid coolant and having a heat exchanger for cooling the coolant, wherein the low-temperature cooling circuit provides said liquid coolant to (a) the charge air cooler and (b) at least one of the electric machine and electronic components allocated to the electric machine, wherein at least a portion of such elements cooled by the liquid coolant are provided with the liquid coolant in series and are arranged such that the element having the greatest sensitivity to temperature is first in series to receive the liquid coolant, and
wherein the low-temperature cooling circuit is designed so that a coolant temperature of max. 80° C. is not exceeded for at least 80% of the vehicle operating time,
wherein the internal combustion engine is integrated into a separate engine cooling circuit, and
wherein the engine cooling circuit and the low-temperature cooling circuit are connected to one another via a feed-through site whose flow rate is controllable.

19. The hybrid drive unit according to claim 18, wherein the electronic components allocated to the at least one electric machine include at least one of: power electronics, a DC/DC converter, an pulse-width-modulation inverter, at least one energy storage device, and a condenser storage mechanism.

* * * * *